(12) United States Patent
Roe et al.

(10) Patent No.: US 10,587,438 B2
(45) Date of Patent: *Mar. 10, 2020

(54) METHOD AND SYSTEM FOR CONTROLLING A MODAL ANTENNA

(71) Applicant: AVX Antenna, Inc., San Diego, CA (US)

(72) Inventors: Michael Roe, San Diego, CA (US); Claudio Anzil, Encinitas, CA (US); Jatan Shah, Irvine, CA (US)

(73) Assignee: AVX Antenna, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/294,262

(22) Filed: Mar. 6, 2019

(65) Prior Publication Data

US 2019/0394072 A1 Dec. 26, 2019

Related U.S. Application Data

(63) Continuation of application No. 16/018,787, filed on Jun. 26, 2018, now Pat. No. 10,263,817.

(51) Int. Cl.
| | | |
|---|---|---|
| *H04B 3/00* | (2006.01) | |
| *H04L 27/04* | (2006.01) | |
| *H04L 27/00* | (2006.01) | |
| *H01Q 3/28* | (2006.01) | |
| *H01Q 1/24* | (2006.01) | |

(52) U.S. Cl.
CPC ............. *H04L 27/04* (2013.01); *H01Q 1/242* (2013.01); *H01Q 3/28* (2013.01); *H04L 27/0002* (2013.01)

(58) Field of Classification Search
CPC ..... H04L 27/04; H04L 27/0002; H01Q 1/242; H01Q 3/28
USPC .................................. 375/257, 295, 316, 219
See application file for complete search history.

(56) References Cited

U.S. PATENT DOCUMENTS

| 6,765,536 B2 | 7/2004 | Phillips et al. |
| 6,987,493 B2 | 1/2006 | Chen |
| 7,068,234 B2 | 6/2006 | Sievenpiper |

(Continued)

OTHER PUBLICATIONS

PCT International Search Report and Written Opinion for corresponding PCT Application No. PCT/US2019/036346, dated Oct. 30, 2019, 13 pages.

*Primary Examiner* — Zewdu A Kassa
(74) *Attorney, Agent, or Firm* — Dority & Manning, P.A.

(57) ABSTRACT

An antenna system is provided. In one example implementation, the antenna system may include a modal antenna that is operable in a plurality of different modes, and each mode may be associated with a different radiation pattern. The antenna system may include a tuning circuit configured to operate the modal antenna in the plurality of different modes. A transmission line may couple a radio frequency circuit to the modal antenna. The radio frequency circuit may be configured to modulate a control signal onto an RF signal using amplitude-shift keying modulation to generate a transmit signal for communication over the transmission line to the tuning circuit. The tuning circuit may be configured to demodulate the control signal such that the radio frequency circuit can adjust a mode of the modal antenna via the control signal. In some embodiments, the amplitude-shift keying modulation may include on-off keying modulation.

20 Claims, 7 Drawing Sheets

(56) References Cited

U.S. PATENT DOCUMENTS

| | | |
|---|---|---|
| 7,215,289 B2 | 5/2007 | Harano |
| 7,830,320 B2 | 11/2010 | Shamblin |
| 7,911,402 B2 | 3/2011 | Rowson et al. |
| 8,362,962 B2 | 1/2013 | Rowson et al. |
| 8,446,318 B2 | 5/2013 | Ali et al. |
| 8,648,755 B2 | 2/2014 | Rowson et al. |
| 8,717,241 B2 | 5/2014 | Shamblin et al. |
| 9,065,496 B2 | 6/2015 | Rowson et al. |
| 9,231,669 B2 | 1/2016 | Desclos et al. |
| 9,240,634 B2 | 1/2016 | Rowson et al. |
| 9,325,543 B2 | 4/2016 | Desclos et al. |
| 9,425,497 B2 | 8/2016 | Pajona et al. |
| 9,439,151 B2 | 9/2016 | Zhu et al. |
| 9,479,242 B2 | 10/2016 | Desclos et al. |
| 9,590,703 B2 | 3/2017 | Desclos et al. |
| 9,755,305 B2 | 9/2017 | Desclos et al. |
| 9,755,580 B2 | 9/2017 | Desclos et al. |
| 9,768,991 B2 | 9/2017 | Desclos et al. |
| 10,263,817 B1 | 4/2019 | Roe et al. |
| 2002/0159511 A1* | 10/2002 | Wilson .................. H04L 27/02 375/222 |
| 2011/0007846 A1 | 1/2011 | Marien |
| 2013/0120200 A1 | 5/2013 | Desclos et al. |
| 2015/0311969 A1 | 10/2015 | Desclos |
| 2016/0036127 A1 | 2/2016 | Desclos et al. |
| 2017/0012681 A1 | 1/2017 | Buliga et al. |
| 2017/0338557 A1* | 11/2017 | Desclos ................ H01Q 1/246 |

* cited by examiner

METHOD AND SYSTEM FOR CONTROLLING A MODAL ANTENNA

CROSS REFERENCE TO RELATED APPLICATIONS

The present application is a continuation of U.S. application Ser. No. 16/018,787 filed on Jun. 26, 2018, which is incorporated in its entirety herein by reference.

FIELD

Example aspects of the present disclosure relate generally to the field of antenna control, for instance, the control of modal antennas configured to operate in a plurality of different modes.

BACKGROUND

Modal antennas are being increasingly used in wireless communication, for instance in smartphone handsets. Such antennas generally provide improved signal quality and a more compact form factor than traditional passive antennas. One modal antenna configuration involves a parasitic element configured to alter a radiation pattern associated with a driven element. In such a configuration, a first transmission line may connect the driven element with a circuit configured to drive the driven element. A separate transmission line may connect a circuit configured to vary the modal properties of the modal antenna with the parasitic element.

SUMMARY

Aspects and advantages of embodiments of the present disclosure will be set forth in part in the following description, or may be learned from the description, or may be learned through practice of the embodiments.

Example aspects of the present disclosure are directed to an antenna system. The antenna system may include a modal antenna including a driven element and a parasitic element positioned proximate to the driven element. The modal antenna may be operable in a plurality of different modes, and each mode may be associated with a different radiation pattern. The antenna system may include a tuning circuit that is configured to control an electrical characteristic associated with the parasitic element to operate the modal antenna in the plurality of different modes. The antenna system may include a radio frequency circuit and a transmission line coupling the radio frequency circuit to the modal antenna. The radio frequency circuit may be configured to modulate a control signal onto an RF signal using amplitude-shift keying modulation to generate a transmit signal for communication over the transmission line to the tuning circuit. The tuning circuit may be configured to demodulate the control signal such that the radio frequency circuit can adjust a mode of the modal antenna via the control signal. In some embodiments, the amplitude-shift keying modulation may include on-off keying modulation.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

Figure 1A:
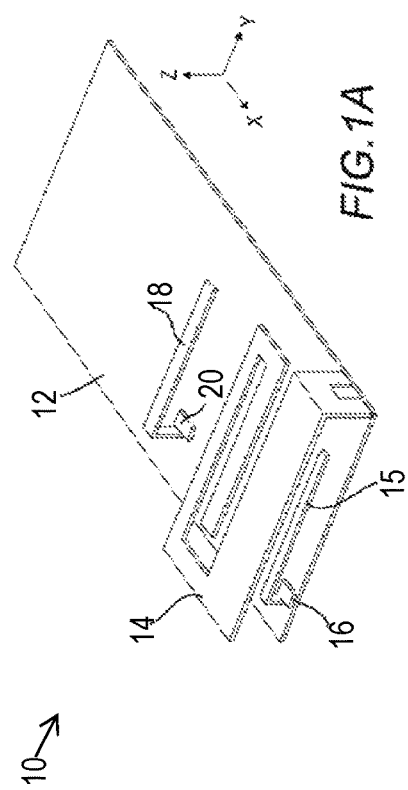
FIG. 1A illustrates an embodiment of a modal antenna 10 according to example embodiments of the present disclosure.

Repeat use of reference characters in the present specification and drawings is intended to represent same or analogous features or elements of the invention.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an antenna system. The antenna system may include a modal antenna including a driven element and a parasitic element positioned proximate to the driven element. The modal antenna may be operable in a plurality of different modes, and each mode may be associated with a different radiation pattern. The antenna system may include a tuning circuit that is configured to control an electrical characteristic associated with the parasitic element to operate the modal antenna in the plurality of different modes. The antenna system may include a radio frequency circuit and a transmission line coupling the radio frequency circuit to the modal antenna. The radio frequency circuit may be configured to modulate a control signal onto an RF signal using amplitude-shift keying modulation to generate a transmit signal for communication over the transmission line to the tuning circuit. The tuning circuit may be configured to demodulate the control signal such that the radio frequency circuit can adjust a mode of the modal antenna via the control signal. In some embodiments, the amplitude-shift keying modulation may include on-off keying modulation.

Employing amplitude-shift keying modulation as described herein may provide several benefits. For example, the RF signal and control signal may be transmitted (as components of the transmit single) via a single transmission line with low interference and/or noise. For instance, amplitude-shift keying may produce reduced resonations at harmonic frequencies associated with the control signal and/or RF signal. This may reduce the noise associated with modulating the control signal onto the RF signal and demodulating the control signal. The resulting high fidelity transmission of the control signal may provide accurate and efficient control over the operation of the modal antenna. Aspects of the present disclosure may find particular application in multiple-in-multiple-out (MIMO) antenna configurations.

Additionally, according to aspects of the present disclosure, clock synchronization may be performed in a fast and efficient manner. This may provide low latency control over the parasitic element and, thus, over the modal operation of the antenna. The resulting data transmission fidelity may contribute to the accurate and efficient control over the operation of the modal antenna.

In some embodiments, the radio frequency circuit may be configured to modulate the control signal onto the RF signal by selectively varying an amplitude associated with a carrier signal. In some embodiments, the radio frequency circuit may be configured to selectively vary the amplitude between about zero and a non-zero value.

In some embodiments, the carrier signal may include a repeating pattern. For example, the carrier signal may include a sinusoidal wave having a generally constant frequency.

In some embodiments, the transmission line may be a single coaxial cable.

In some embodiments, the radio signals may be defined within a first frequency band, and the control signals may be defined within a second frequency band that is distinct from the first frequency band. For example, the first frequency band may range from about 500 MHz to about 50 GHz. As another example, the second frequency band may range ranges from about 10 MHz to about 1 GHz.

In some embodiments, the transmit signal is associated with a first clock frequency, and wherein the tuning circuit is configured to synchronize a local clock frequency with the first frequency.

In some embodiments, the antenna system may include a first circuit board and a second circuit board that is physically separate from the first circuit board. The radio frequency circuit may be disposed on the first circuit board, and at least one of the tuning circuit or modal antenna is disposed on the second circuit board.

In some embodiments, the radio frequency circuit may include a front end module configured to generate the RF signal and a control circuit configured to modulate the control signal onto the RF signal using amplitude-shift keying modulation to generate the transmit signal.

In some embodiments, the antenna system may include at least one additional modal antenna including a parasitic element and at least one additional tuning circuit. The radio frequency circuit may include at least one additional front end module that is configured to transmit an RF signal to the driven element of the at least one additional modal antenna. The control circuit of the radio frequency circuit may be configured to adjust a mode of the at least one additional modal antenna by modulating a control signal onto the RF signal that is transmitted to the driven element of the at least one additional modal antenna.

Another example embodiment of the present disclosure is directed to a method for controlling a modal antenna. The method may include modulating, at a radio frequency circuit, a control signal onto an RF signal using amplitude-shift keying modulation. The method may include communicating the RF signal to a tuning circuit via a single coaxial transmission line. The method may include demodulating, at the tuning circuit, the control signal from the RF signal. The method may include controlling, from the radio frequency circuit, an electrical characteristic associated with a parasitic element of a modal antenna via the control signal and tuning circuit to operate the modal antenna in a plurality of different modes. Each mode may be associated with a different radiation pattern for the modal antenna.

In some embodiments, modulating the control signal onto the RF signal using amplitude-shift keying modulation at the radio frequency circuit may include modulating the RF signal using on-off keying modulation.

In some embodiments, modulating the control signal onto the RF signal comprises selectively varying an amplitude associated with a carrier signal. In some embodiments, selectively varying the amplitude associated with the carrier signal may include varying the amplitude between about zero and a non-zero value.

In some embodiments, the carrier signal may include at least one of a sinusoidal wave having a generally constant frequency or any repeating pattern.

Another example embodiment of the present disclosure is directed to an antenna system. The antenna system may include a modal antenna including a driven element and a parasitic element positioned proximate to the driven element. The modal antenna may be operable in a plurality of different modes, and each mode may be associated with a different radiation pattern. The antenna system may also include a radio frequency circuit including a front end module and a control circuit. The antenna system may also include a transmission line coupling the radio frequency circuit to the modal antenna. The antenna system may also include a tuning circuit comprising a de-modulator and a control module coupled with the de-modulator. The front end module may be configured to produce an RF signal. The control circuit may be configured to modulate a control signal onto the RF signal using on-off keying modulation to generate a transmit signal by selectively varying an amplitude associated with a sinusoidal carrier signal between about zero and a non-zero value. The carrier signal may include a sinusoidal wave having a generally constant frequency. The de-modulator may be configured to demodulate the control signal, and the control module may be configured to adjust a mode of the modal antenna based on the control signal.

FIG. 1A illustrates an embodiment of a modal antenna 10 in accordance with aspects of the present disclosure. The modal antenna 10 may include a circuit board 12 (e.g., including a ground plane) and a driven antenna element 14 disposed on the circuit board 12. An antenna volume may be defined between the circuit board (e.g., and the ground plane) and the driven antenna element. A first parasitic element 15 may be positioned at least partially within the antenna volume. A first active tuning element 16 may be coupled with the parasitic element 15. The first active tuning element 16 can be a passive or active component or series of components and may be configured to alter a reactance on the first parasitic element 14 either by way of a variable reactance, or shorting to ground, resulting in a frequency shift of the antenna.

In some embodiments, a second parasitic element 18 may be disposed proximate the circuit board 12 and may be positioned outside of the antenna volume. The second parasitic element 18 may further include a second active tuning element 20 which may individually include one or more active and/or passive components. The second parasitic element 18 may be positioned adjacent the driven element 14 and may also be positioned outside of the antenna volume.

The described configuration may provide an ability to shift the radiation pattern characteristics of the driven antenna element by varying a reactance thereon. Shifting the antenna radiation pattern can be referred to as "beam steering". In instances where the antenna radiation pattern comprises a null, a similar operation can be referred to as "null steering" since the null can be shifted to an alternative position about the antenna (e.g., to reduce interference). In some embodiments, the second active tuning element 20 may include a switch for connecting the second parasitic to ground when "On" and for terminating the short when "Off". It should however be noted that a variable reactance on either of the first or second parasitic elements, for example by using a variable capacitor or other tunable component, may further provide a variable shifting of the antenna pattern or the frequency response. For example, the first active tuning element 16 and/or second active tuning element 18 may include at least one of a tunable capacitor, MEMS device, tunable inductor, switch, a tunable phase shifter, a field-effect transistor, or a diode.

Figure 1B:
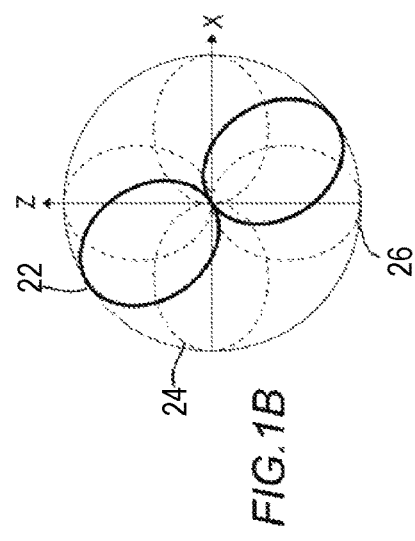
FIG. 1B illustrates a two-dimensional antenna radiation pattern associated with the modal antenna of FIG. 1A.

FIG. 1B illustrates a two-dimensional antenna radiation pattern associated with the modal antenna of FIG. 1A. The radiation pattern may be shifted by controlling an electrical characteristic associated with at least one of the first and second parasitic elements 16, 18 of the modal antenna 10. For example, in some embodiments, the radiation pattern may be shifted from a first mode 22 to a second mode 24, or a third mode 26.

Figure 1C:
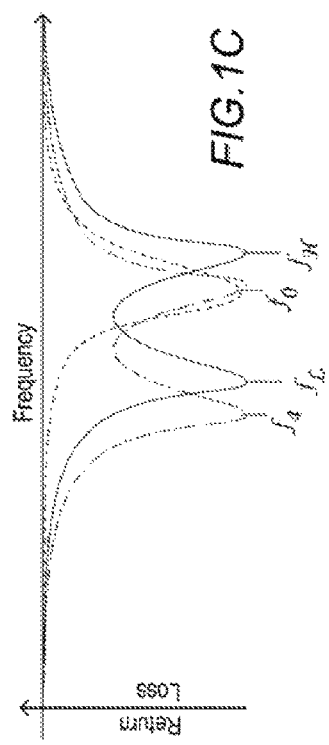
FIG. 1C illustrates an example frequency plot of the modal antenna of FIG. 1A according to example embodiments of the present disclosure.

FIG. 1C illustrates an example frequency plot of the modal antenna of FIG. 1A according to some aspects of the present disclosure. The frequency of the antenna can be shifted by controlling an electrical characteristic associated with at least one of the first or second parasitic elements 16, 18 of the modal antenna 10. For example, a first frequency ($f_0$) of the antenna may be achieved when the first and second parasitic elements are switched "Off"; the frequencies ($f_L$) and ($f_H$) may be produced when the second parasitic is shorted to ground; and the frequencies ($f_4$; $f_0$) may be produced when the first and second parasitic elements are each shorted to ground. It should be understood that other configurations are possible within the scope of this disclosure. For example, more or fewer parasitic elements may be employed. The positioning of the parasitic elements may be altered to achieve additional modes that may exhibit different frequencies and/or combinations of frequencies.

FIGS. 1A-1C depict one example modal antenna having a plurality of modes for purposes of illustration and discussion. Those of ordinary skill in the art, using the disclosures provided herein, will understand that other modal antennas and/or antenna configurations can be used without deviating from the scope of the present disclosure. As used herein a "modal antenna" refers to an antenna capable of operating in a plurality of modes where each mode is associated with a distinct radiation pattern.

Figure 2:
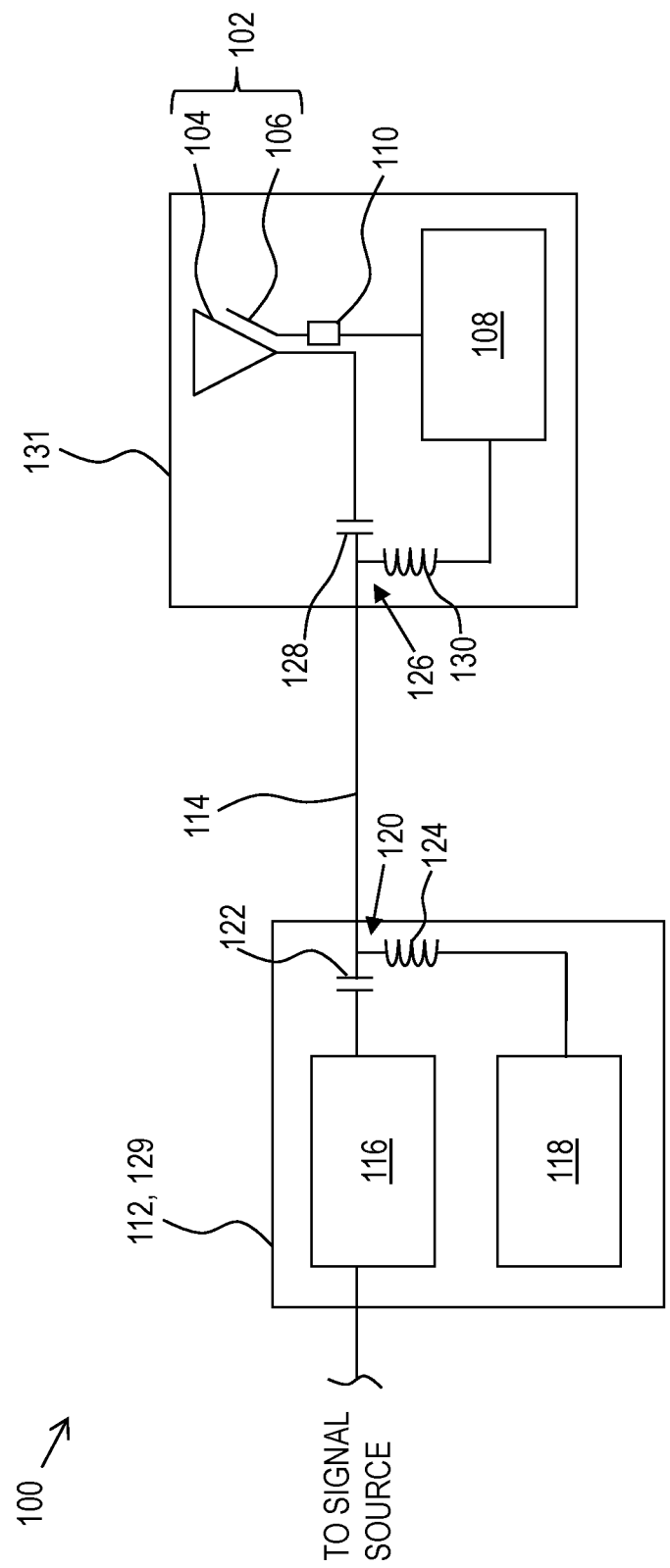
FIG. 2 illustrates a schematic diagram of an example antenna system according to example embodiments of the present disclosure.

FIG. 2 illustrates a schematic diagram of an embodiment of an antenna system 100 in accordance with example aspects of the present disclosure. The antenna system 100 may include a modal antenna 102. The modal antenna 102 may include a driven element 104 and a parasitic element 106 positioned proximate to the driven element 104. The modal antenna 102 may be operable in a plurality of different modes, and each mode may be associated with a different radiation pattern, for example as described above with reference to FIGS. 1A through 1C.

A tuning circuit 108 may be configured to control an electrical characteristic associated with the parasitic element 106 to operate the modal antenna 102 in the plurality of different modes. The tuning circuit 108 may be configured demodulate a control signal from a transmit signal and control the electrical characteristic of the parasitic element 106 based on control instructions associated with the control signal, for example as explained in greater detail with reference to FIGS. 4 and 5.

A tunable component 110 may be coupled with the parasitic element 106, and the tuning circuit 108 may be configured to control the tunable component 110 to alter the electrical connectivity of the parasitic element 106 with a voltage or current source or sink, such as connecting the parasitic element 106 with ground.

A radio frequency circuit 112 may be configured to transmit an RF signal to the driven element 104 of the modal antenna 102. For example, a transmission line 114 may couple the radio frequency circuit 110 to the modal antenna 102. In some embodiments, the transmission line 114 may be a single coaxial cable. The radio frequency circuit 112 may be configured to amplify or otherwise generate the RF signal, which is transmitted through the transmission line 114 (as a component of the transmit signal) to the driven element 104 of the modal antenna 102.

In some embodiments, the radio frequency circuit 112 may include a front end module 116 and/or a control circuit 118. The front end module 116 may be configured to generate and/or amplify the RF signal that is transmitted to the driven element 104. The control circuit 118 may be configured to modulate a control signal onto the RF signal using amplitude-shift keying modulation to generate the transmit signal, for example as explained in greater detail below with reference to FIG. 4.

The transmission line 114 may be coupled with various components (e.g., using Bias Tee circuits) that are configured to aid in the combination and/or separation of signals occupying various frequency bands. For example, a first Bias Tee circuit 120 may couple the front end module 116 and the control circuit 118 with the transmission line 114. The first Bias Tee circuit 120 may include a capacitor 122 coupling the transmission line 114 with front end module 116 and an inductor 124 coupling the control unit 118 with the transmission line 114. A second Bias Tee circuit 126 may couple the driven element 104 and the tuning circuit 108 with the transmission line 114. The second Bias Tee circuit 126 may include a capacitor 128 coupling the transmission line 114 with the driven element 104 and an inductor 130 coupling the transmission line 114 with the tuning circuit 108.

The front end module 116 may transmit the RF signal through the capacitor 122 of the first Bias Tee circuit 120. The control circuit 118 may modulate the control signal onto the RF signal through the inductor 124 of the first Bias Tee circuit 120 to generate the control signal in the transmission line 114. The tuning circuit 108 may de-modulate the control signal from the transmit signal via the inductor 130 of the second Bias Tee circuit 128. The RF signal component of the transmit signal may be transmitted to the driven element 104 of the modal antenna 102 via the capacitor 128 of the second Bias Tee circuit 128.

In some embodiments, the antenna system 100 may include a first circuit board 129 and a second circuit board 131 that is physically separate from the first circuit board 129. The radio frequency circuit 112 may be disposed on the first circuit board 129, and at least one of the tuning circuit 108 or modal antenna 102 may be disposed on the second circuit board 131. This may allow radio frequency circuit 112 to be physically separated from the tuning circuit and/or modal antenna 102 without employing multiple transmission lines or adversely affecting the operation of the antenna system 100.

In some embodiments, the RF signal may be defined within a first frequency band, and the control signal may be defined within a second frequency band that is distinct from the first frequency band. For example, the first frequency band may range from about 500 MHz to about 50 GHz, in some embodiments from about 1 GHz to about 25 GHz, in some embodiments from about 2 GHz to about 7 GHz, e.g., about 5 GHz. The second frequency band may range from about 10 MHz to about 1 GHz, in some embodiments from about 20 MHz to about 800 MHz, in some embodiments from about 30 MHz to about 500 MHz, in some embodiments from about 50 MHz to about 250 MHz, e.g., about 100 MHz.

Figure 3:
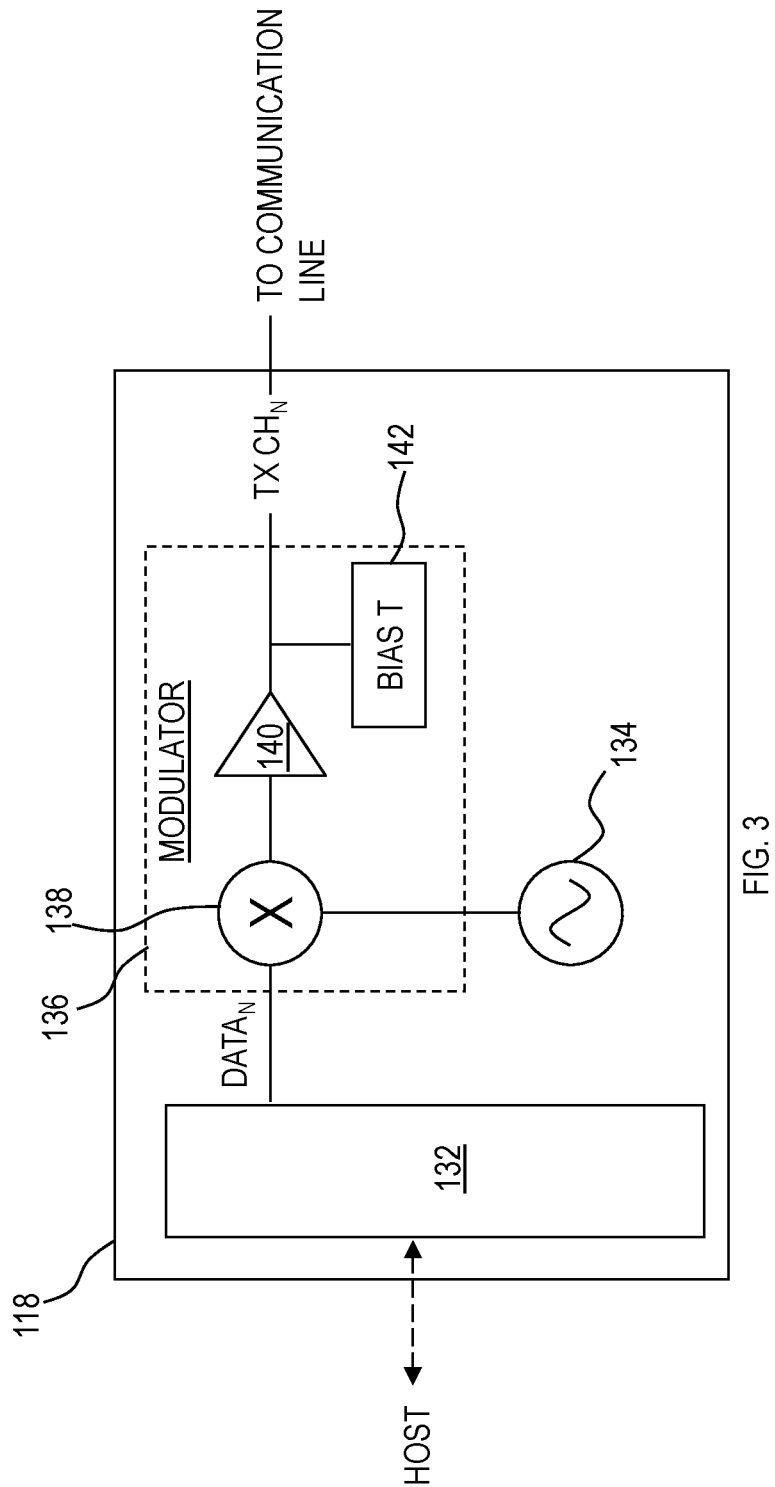
FIG. 3 illustrates a schematic diagram of an example control circuit of the antenna system according to example embodiments of the present disclosure.

FIG. 3 illustrates a schematic diagram of one embodiment of the control circuit 118 of the antenna system 100 illustrated in FIG. 2. The control circuit 118 may include a processor 132, and the processor 132 may be configured to generate or receive control instructions for changing the mode of the modal antenna 102 (illustrated in FIG. 2), or otherwise adjusting the orientation or frequency of the radiation pattern of the modal antenna 102. For example, the processor 132 may receive the control instructions from another processor (represented by HOST in FIG. 3) and may generate an output that contains data (represented by DATA$_N$ in FIG. 3) that describes the instructions. The data may have any suitable bit depth. For example, in some embodiments the data may be in binary format. In other embodiments, the data may be in hexadecimal format, decimal format, etc.

The control circuit 118 may also include a carrier signal source 134. In some embodiments, the carrier signal source 134 may be configured to generate a carrier signal that includes a sinusoidal wave, which may have a generally constant frequency. In other embodiments, the carrier signal may be or include any suitable signal. For example, in some embodiments, the carrier signal may be or include any suitable repeating pattern, and is not limited to being sinusoidal or having a generally constant frequency.

The control circuit 118 may also include a modulator 136 that is configured to modulate the output of the processor onto the carrier signal to produce the control signal (represented by TX CH$_N$ in FIG. 3). The modulator 136 may include a multiplexer 138 that is configured to combine the output containing the data (represented by DATA$_N$ in FIG. 3), which may describe the control instructions, with the carrier signal from the carrier signal source 134. For example, the modulator 136 may be configured to scale the amplitude of the carrier signal from the carrier signal source 134 to produce the control signal, for example by performing amplitude shift keying modulation (e.g., on-off keying modulation), for example as described in greater detail below with reference to FIG. 4. The modulator 136 may also include an amplifier 140 and a Bias Tee circuit 142.

Figure 4:
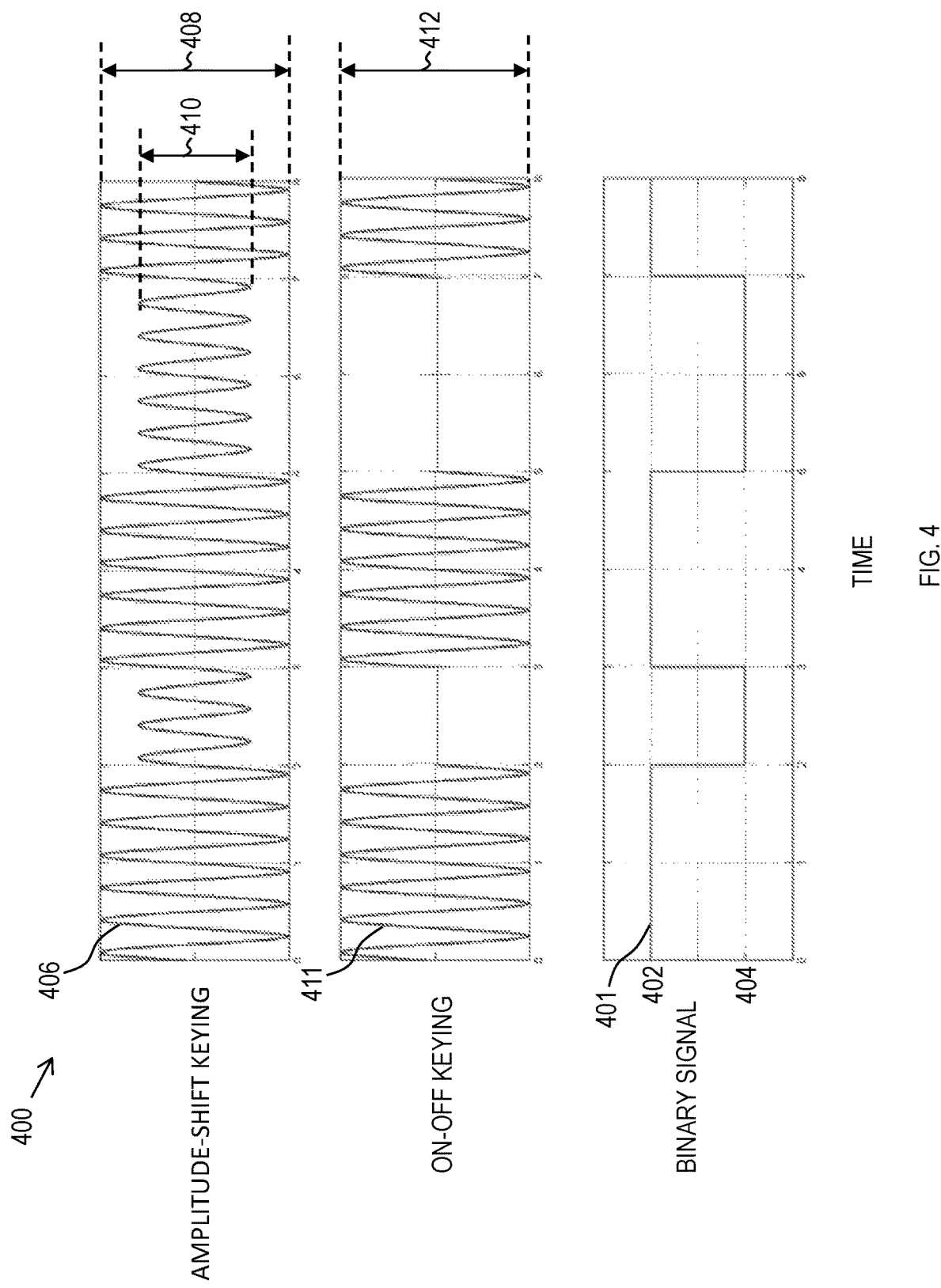
FIG. 4 illustrates a series of time-aligned charts representing simplified examples of amplitude-shift keying modulation and on-off keying modulation.

FIG. 4 illustrates a series of time-aligned charts 400 representing simplified examples of amplitude-shift keying modulation and on-off keying modulation. A binary signal 401 may alternate between a first voltage level 402 and a second voltage level 404 in a manner that describes the binary data set. The binary signal 401 may correspond to a simplified example of the output of processor 132, which may contain the data describing the control instructions, for example as described above with reference to FIG. 3. Amplitude-shift keying modulation may include representing the binary signal 401 by representing the first voltage level 402 as a sinusoidal signal 406 having a varying amplitude. For example, the sinusoidal signal 406 may have a first amplitude 408 that represents the first voltage 402 of the binary signal 401, and may have a second amplitude 410 that represents the second voltage level 404 of the binary signal 401.

On-off keying modulation is a type of amplitude-shift keying modulation. In on-off keying modulation, the binary signal 401 may be represented by a sinusoidal signal 411 having a varying amplitude. The sinusoidal signal 411 may have a first amplitude 412 that represents the first voltage level 402 of the binary signal 401. However, the second voltage level 404 may be represented by an absence of the sinusoidal signal 410. In other words, the sinusoidal signal 410 may have an amplitude of about zero to represent the second voltage 404 of the binary signal 401.

Figure 5:
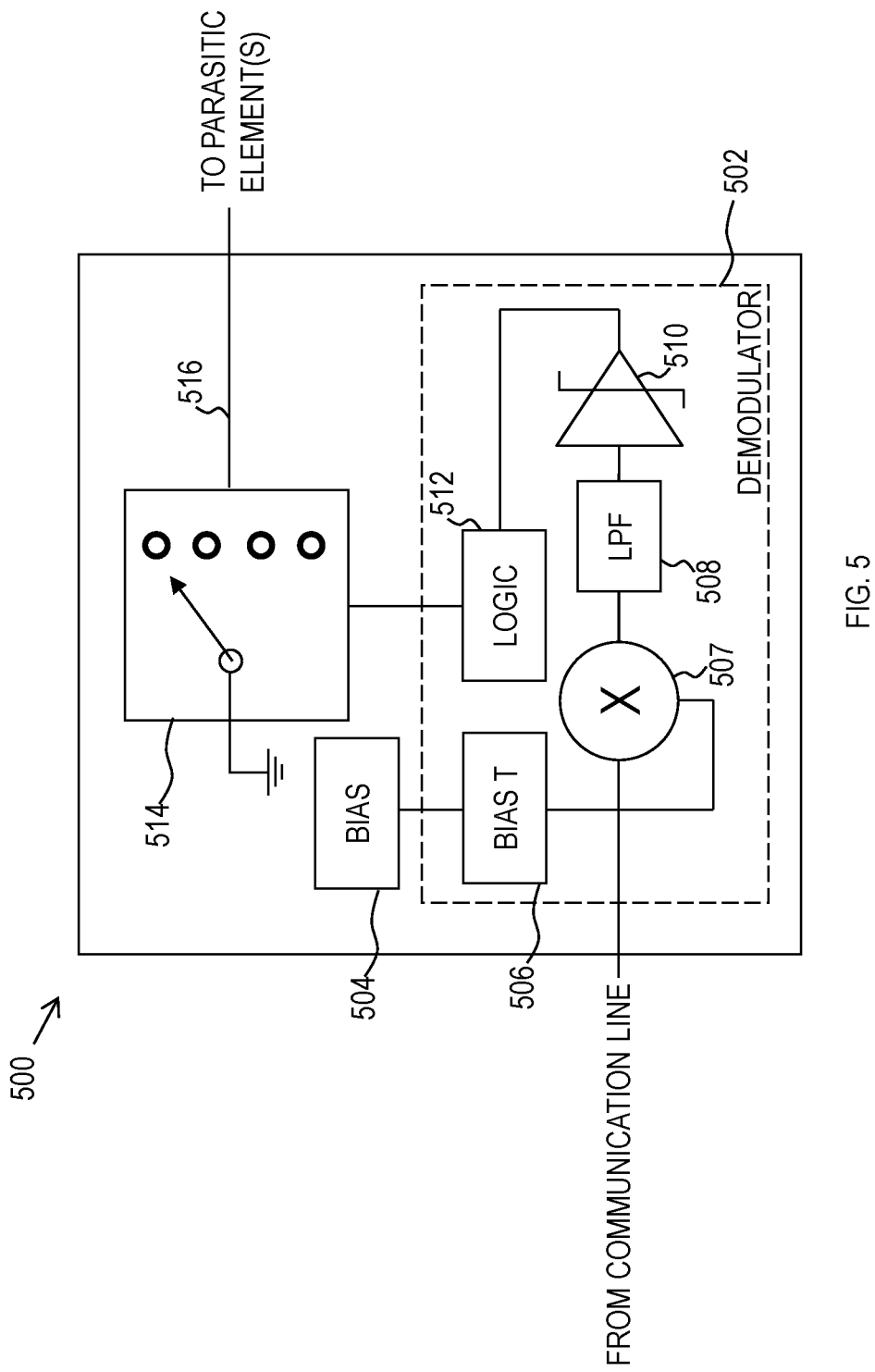
FIG. 5 illustrates a schematic diagram of an example tuning circuit of the antenna system according to example embodiments of the present disclosure.

FIG. 5 illustrates a schematic diagram of one embodiment of the tuning circuit 500, for example corresponding to the tuning circuit 108 discussed above with reference to FIG. 3, in accordance with aspects of the present disclosure. The tuning circuit 500 may include a demodulator 502 and a bias 504. The demodulator 502 may include a Bias Tee circuit 506 coupled with the bias 504, and multiplexer 507 that is coupled with the communication line 114 (illustrated in FIG. 2).

The tuning circuit 500 may also include a low pass filter 508 that is configured to filter at least one frequency band. For example, the low pass filter 508 may be configured to filter at least one frequency band that is higher than the frequency of the carrier signal frequency. As such, the low pass filter 508 may isolate or relatively increase the strength of the carrier signal frequency. The demodulator 502 may also include a diode 510, such as a zenner diode. The diode 510 may be coupled with a logic circuit 512 that is configured to interpret the control instructions associated with (e.g., contained within) the control signal.

The logic circuit 512 (e.g., processors, ASICS, etc. configured to execute computer-readable instructions to implement logic operations) may also be configured to control the operation of a switch 514 based on the control instructions associated with (e.g., contained within) the control signal. The switch 514 may be connected with ground and be configured to switch between a plurality of states. For example, the switch 514 may be configured to selectively connect an output 516 of the switch 514 with ground or otherwise vary the electrical connectivity of the output 516 to control an electrical characteristic associated with the parasitic element 106 (illustrated in FIG. 2) and operate the modal antenna in the plurality of different modes. For example, the switch 514 may be configured to adjust the operation of the tunable component 110 (illustrated in FIG. 2) to alter the electrical connectivity of the parasitic element 106 with a source or sink (e.g., a voltage source/sink or current source/sink), For example, the switch 514 may be configured to selectively connect the parasitic element 106 with ground.

Frequency drift, which is the relative difference between two clock frequencies, may develop between a local clock frequency that is associated with the tuning circuit 108, 500 and a clock frequency (e.g., a master clock frequency) associated with the control circuit 118. To minimize frequency drift, the tuning circuit 108, 500 may be configured to synchronize the local clock frequency with the master clock frequency.

As an example, a first clock frequency may be associated with the transmit signal, and the tuning circuit 500 may be configured to synchronize the local clock frequency associated with the tuning circuit 500 with the first frequency. The first clock frequency may correspond to (e.g., be equal to or be a multiple of) a frequency of the carrier signal that is generated by the sinusoidal wave source 134 or another harmonic source associated with the control circuit 118. For instance, the first clock frequency may be present in portions of the control signal that have a non-zero amplitude.

The tuning circuit 500 (e.g., the logic circuit 512) may include a tunable frequency source, such as a local tunable harmonic oscillator (e.g., a ring oscillator) configured to provide the local clock frequency associated with the tuning circuit 500. The logic circuit 512 may be configured to sample the signal received by the logic circuit 512 (e.g., from the diode 510) and perform a frequency search operation with respect to the signal. The frequency search operation may determine an appropriate sampling frequency. For example, the logic circuit 512 may sample the control signal (or a conditioned version thereof that is output by the diode 510) for a time period corresponding to an expected phrase. The expected phrase may include a signal pattern that is expected to be present in the control signal. As an example, the expected phrase may present at the beginning and/or end of one or more transmitted data "frames" as a "preamble" or "postamble". The logic circuit 512 may be configured to recognize or detect the expected phrase to locate the beginning and/or end of the frame(s). The logic circuit 512 may then determine a phase error measured in terms of the number of local oscillator "clock edges" present in the sample compared with a number of local oscillator "clock edges" expected to be present in the sample based on the expected phrase.

The logic circuit 512 may then perform the frequency search operation. For example, the frequency search operation may include repeating the steps of (1) sampling for a time period corresponding to the length of the expected phrase, (2) determining a phase error by comparing the number of clock edges present in the sample with the number of expected clock edges, and (3) adjusting the local clock frequency (e.g., frequency of the local oscillator) until the local clock frequency is sufficiently synchronized with the master clock frequency associated with the control circuit 118. For example, the local clock frequency may be determined to be sufficiently synchronized when the phase error is less than a threshold (e.g., a predetermined threshold value).

In some embodiments, the tuning circuit may employ a numerically controlled oscillator that is configured to count data edge transitions of the signal received by the tuning circuit. If the number of data edge transitions fall outside of an expected range (e.g., a predetermined range), the tuning circuit may reject or ignore the associated data frame. If the count of data edge transitions falls within the expected range, the tuning circuit may adjust a frequency associated with an internal oscillator of the tuning circuit (e.g., the local clock frequency). For example, the tuning circuit may be configured to increase or decrease the internal oscillator frequency to compensate for drift between the frequency of the internal oscillator frequency of the tuning circuit and a clock or oscillator frequency associated with the RF circuit and/or control circuit, which may occur during normal operation.

Figure 6:
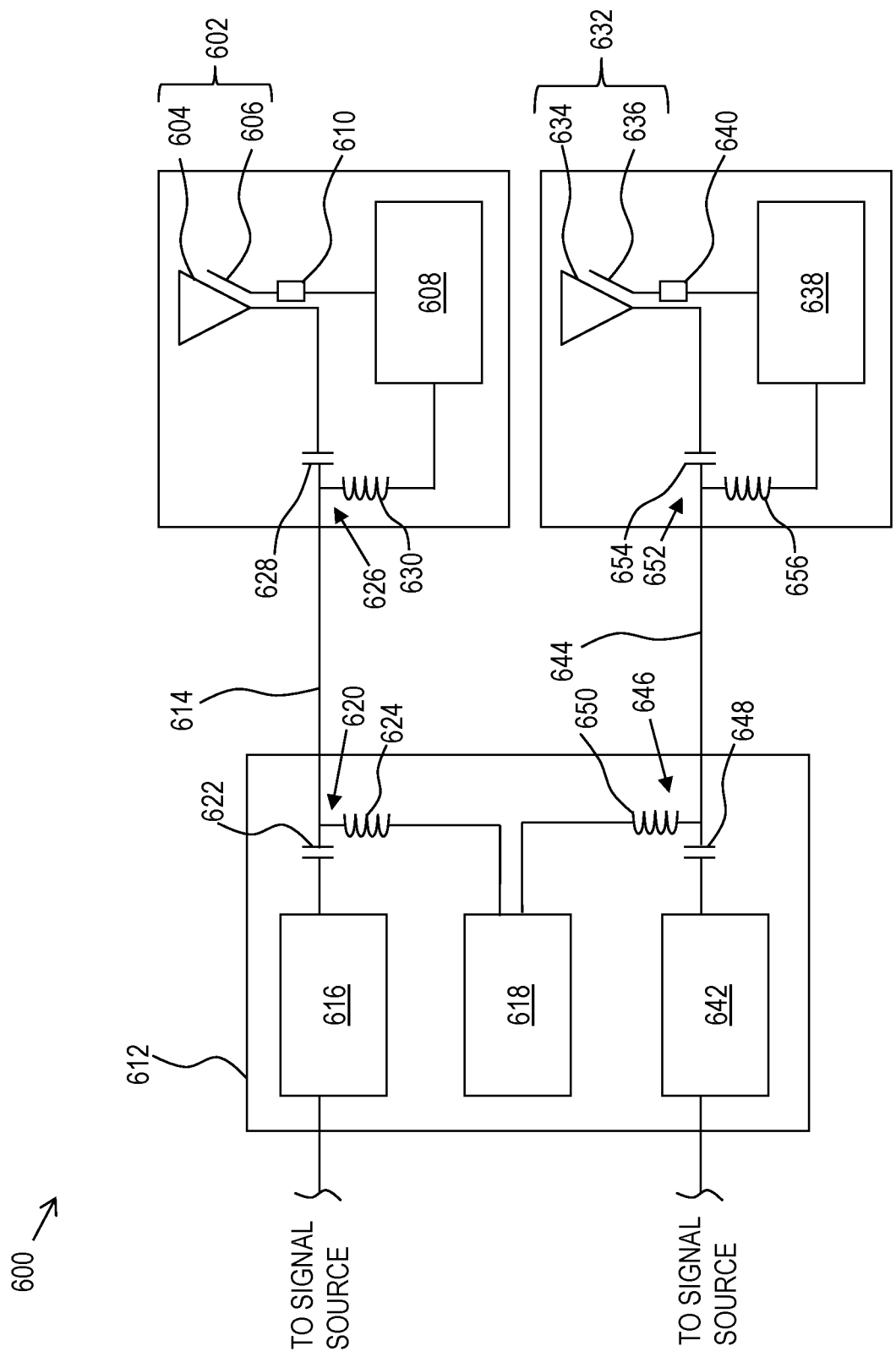
FIG. 6 illustrates a schematic diagram of an antenna system according to example embodiments of the present disclosure.

FIG. 6 illustrates another embodiment a schematic diagram of an embodiment of an antenna system 600 in accordance with aspects of the present disclosure. The antenna system 600 may be generally similarly configured to the antenna system 100 described above with reference to FIG. 2. For example, the antenna system 600 may include a modal antenna 602 including a driven element 604 and parasitic element 606, a tuning circuit 608, an RF circuit 612, a transmission line 614, front end module 616, control circuit 618, a first Bias Tee circuit 620 including a capacitor 622 and inductor 624, and a second Bias Tee circuit 626 including a capacitor 628 and inductor 630.

The antenna system 600 may also include a second modal antenna 632 including a driven element 634 and a parasitic element 636. A second tuning circuit 638 may be configured to control an electrical characteristic associated with the parasitic element 636 to operate the modal antenna 632 in the plurality of different modes. For example, a second tunable component 640 may be coupled with the parasitic element 636, and the tuning circuit 638 may be configured to control the second tunable component 640 to alter the electrical connectivity of the parasitic element 636 of the second modal antenna 632 with a voltage or current source or sink, such as connecting the parasitic element 106 with ground.

The radio frequency circuit 612 may include a second front end module 642 and a second transmission line 644. The second front end module 642 may be configured to generate and/or amplify a second RF signal. The control circuit 618 may be configured to modulate a second control signal onto the second RF signal to generate a second transmit signal. In some embodiments, the control circuit 618 may modulate the second control signal onto the second RF signal using amplitude-shift keying modulation, for example as explained above with reference to FIGS. 3 and 4.

The second transmission line 644 may be coupled with various components using Bias Tees configured to aid in the combination and/or separation of signals occupying various frequency bands. For example, a third Bias Tee circuit 646 may couple the second front end module 642 and the control circuit 618 with the second transmission line 644. The third Bias Tee circuit 646 may include a capacitor 648 coupling the second front end module 642 with the second transmission line 644 and an inductor 650 coupling the control unit 618 with the second transmission line 644.

A fourth Bias Tee circuit 652 may couple the second transmission line 644 with the driven element 634 of the second modal antenna 632 and the tuning circuit 108. The fourth Bias Tee circuit 652 may include a capacitor 654 coupling the second transmission line 644 with the driven element 634 of the second modal antenna 632 and a inductor 656 coupling the second transmission line 644 with the second tuning circuit 638.

The second front end module 642 may transmit the second RF signal through the capacitor 648 of the third Bias Tee circuit 648. The control circuit 618 may modulate the second control signal onto the second RF signal through the inductor 650 of the third Bias Tee circuit 646 to generate the second transmit signal. The second tuning circuit 638 may de-modulate the control signal from the second transmit signal via the inductor 656 of the fourth Bias Tee circuit 652. The RF signal component of the second transmit signal may be transmitted to the driven element 634 of the second modal antenna 632 via the capacitor 654 of the fourth Bias Tee circuit 652.

In this embodiment, the control circuit 618 may have a separate output associated with each of the transmission lines 614, 644. The control circuit 618 may be similarly configured as the control circuit 118 described above with reference to FIG. 3 and may include additional or components configured to provide the separate output for the second transmission line 644. For example, the control circuit 618 may include a second processor 132, sinusoidal wave source 134, modulator 136, multiplexer 138, amplifier 140 and/or Bias Tee circuit 142 such that a second output is provided.

In some embodiments, the antenna system may include a plurality of antennas in a multiple-in-multiple-out (MIMO) configuration. Multiple pairs of control circuits and tuning circuits may be configured to control multiple modal antennas as well as multiple passive antennas. For example, the antenna system may include N tuning circuits (each paired with a respective control circuit) configured to control the operation of M modal antennas and (N-M) passive antennas, where N and M are each positive integers, and where N is greater than or equal to M Additionally, in some embodiments, one control circuit may include multiple outputs and be paired with multiple tuning circuits, for example as described with reference to FIG. 6. In any event, the number of tuning circuits, N, may range up to any suitable number. For example, in some embodiments, N may range from 2 to 20, or greater. M may also range from 2 to 20, or greater.

It should be understood that many variations are possible within the scope of this disclosure. For example, in other embodiments, a separate control circuit may be associated with the each transmission line 614, 644. Additionally, in other embodiments, a single front end module may be configured to generate the respective RF signals. In some embodiments, a single tuning circuit may be configured to control an electrical characteristic associated with a parasitic element of each modal antenna of the system. Moreover, in some embodiments, the system may include more than two modal antennas. Additionally, in some embodiments, the system may include a combination of one or more modal antennas and one or more non-modal or passive antennas that are not configured to operate in a plurality of modes. In some embodiments, one or more modal antennas may include more than one parasitic elements. A single control circuit may be configured to adjust respective tunable elements associated with the parasitic elements to control electrical characteristics associated with the parasitic elements and operate the modal antenna in the plurality of different modes. In other embodiments, multiple control circuits may be used to respectively adjust the tunable elements. It should be understood that yet other variations, modification, combinations, and the like are possible with the scope of this disclosure.

Figure 7:
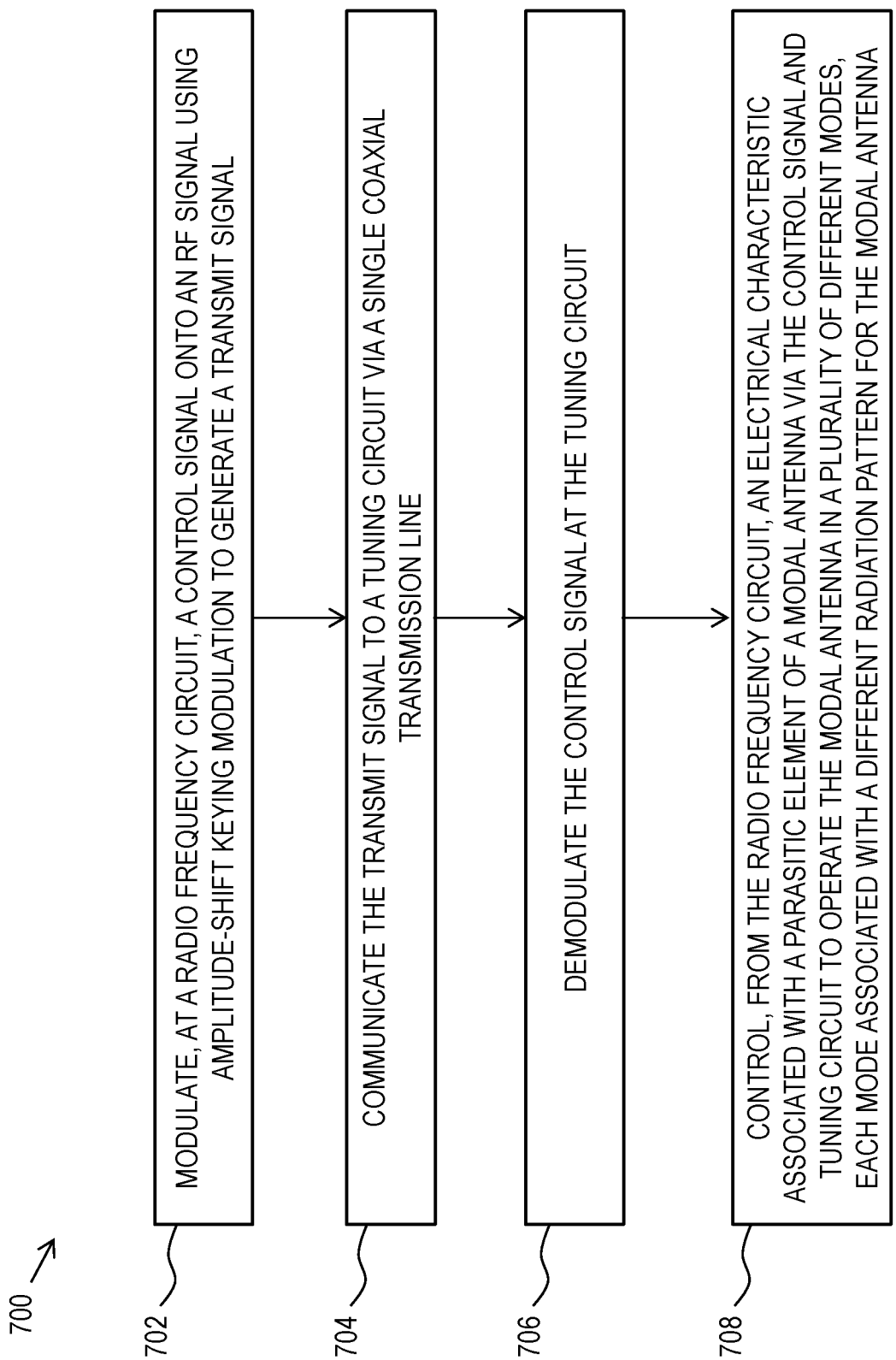
FIG. 7 depicts a flow diagram of an example method according to example embodiments of the present disclosure.

FIG. 7 depicts a flow diagram of an example method 700 for detecting a stall condition of an electric motor according to example embodiments of the present disclosure. FIG. 7 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. In addition, various steps (not illustrated) can be performed without deviating from the scope of the present disclosure. Additionally, the method 700 is generally discussed with reference to the antenna systems 200, 600 described above with reference to FIGS. 2 and 6. However, it should be understood that aspects of the present method 700 may find application with any suitable antenna system including a modal antenna.

The method 700 may include, at (702), modulating, at a radio frequency circuit, a control signal onto an RF signal using amplitude-shift keying modulation to generate a transmit signal. For example, the control signal may contain control instructions for changing the mode of the modal antenna or otherwise adjusting the orientation or frequency of the radiation pattern of the modal antenna. For example, the radio frequency circuit 112 may include a control circuit 118 that is configured to modulate the control signal onto the RF signal using amplitude-shift keying modulation to generate a transmit signal, for example as described above with reference to FIGS. 3 and 4. In some embodiments, modulating the control signal onto the RF signal using amplitude-shift keying modulation at the radio frequency circuit may include modulating the RF signal using on-off keying modulation, for example as described above with reference to FIG. 4.

In some embodiments, modulating the control signal onto the RF signal may include selectively varying an amplitude associated with a carrier signal. For example, referring back to FIG. 4, the amplitude may be varied between a first amplitude 408 and a second amplitude 410, which represent a first voltage 402 and a second voltage 404, respectively, of an associated binary signal 401. In some embodiments, the selectively varying the amplitude associated with the carrier signal may include varying the amplitude between about zero and a non-zero value, for example as discussed above with reference to on-off keying and FIG. 4. In some embodiments, the carrier signal may include a sinusoidal wave. The sinusoidal wave may have a generally constant frequency, or, in some embodiments, may include any suitable repeating pattern.

The method 700 may include, at (704), communicating the transmit signal to a tuning circuit via a single coaxial transmission line. For example, as described above with reference to FIG. 4, the radio frequency circuit 112 may include a front end module 116 that may communicate the RF signal through a capacitor 122 of a first Bias Tee 120, through a transmission line 114, and through a capacitor 128 of a second Bias Tee 128 to a driven element 104 of a modal antenna 102. The control circuit 118 may modulate a control signal onto the RF signal through the inductor 124 of the first Bias Tee 120, through the transmission line 114, and through the inductor 130 of the second Bias Tee 128 to the tuning circuit 108.

The method 700 may include, at (706), demodulating the control signal at the tuning circuit. For example, as described above with reference to FIGS. 2 and 5, the tuning circuit 108, 500 may be configured to de-modulate the control signal from the transmit signal via the inductor 130 of the second Bias Tee 126. The tuning circuit 108, 500 may also be configured to filter and/or amplify the control signal to isolate or relatively increase the strength of a carrier signal frequency associated with a carrier signal. A logic circuit 512 may be configured to interpret control instructions associated with (e.g., contained in) the control signal.

The method 700 may include, at (708), controlling, from the radio frequency circuit, an electrical characteristic associated with a parasitic element of a modal antenna via the control signal and tuning circuit to operate the modal antenna in a plurality of different modes. Each mode may be associated with a different radiation pattern for the modal antenna. For example, the tuning circuit 108, 500 may be configured to control a switch 514 to selectively connect an output 516 of the switch 514 with ground or otherwise vary the electrical connectivity of the output 516 of the switch 514 to control an electrical characteristic associated with the parasitic element 106 (illustrated in FIG. 2) and operate the modal antenna in the plurality of different modes. For example, the switch 515 may be configured to adjust the operation of the tunable component 110 (illustrated in FIG. 2) to alter the electrical connectivity of the parasitic element 106 with a voltage or current source or sink, such as electrically shorting the parasitic element 106 with ground.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna system, comprising:
   a modal antenna comprising a driven element and a parasitic element positioned proximate to the driven element, the modal antenna operable in a plurality of different modes, each mode associated with a different radiation pattern;
   a radio frequency circuit; and
   a transmission line coupling the radio frequency circuit to the modal antenna;
   wherein the radio frequency circuit is configured to modulate a control signal onto an RF signal to generate a transmit signal for communication over the transmission line to control the antenna system
   wherein the RF signal is defined within a first frequency band, and the control signal is defined within a second frequency band that is distinct from the first frequency band.

2. The antenna system of claim 1, further comprising a tuning circuit configured to demodulate the control signal such that the radio frequency circuit can adjust a mode of the modal antenna via the control signal to control the antenna system.

3. The antenna system of claim 2, further comprising a first circuit board and a second circuit board that is physically separate from the first circuit board, and wherein the radio frequency circuit is disposed on the first circuit board, and at least one of the tuning circuit or modal antenna is disposed on the second circuit board.

4. The antenna system of claim 1, wherein the radio frequency circuit is configured to modulate the control signal onto the RF signal using amplitude-shift keying modulation.

5. The antenna system of claim 4, wherein the radio frequency circuit is configured to modulate the control signal onto the RF signal using on-off keying modulation.

6. The antenna system of claim 1, wherein the radio frequency circuit is configured to modulate the control signal onto the RF signal by selectively varying an amplitude associated with a carrier signal.

7. The antenna system of claim 6, wherein the radio frequency circuit is configured to selectively vary the amplitude between about zero and a non-zero value.

8. The antenna system of claim 6, wherein the carrier signal comprises a sinusoidal wave having a generally constant frequency.

9. The antenna system of claim 6, wherein the carrier signal comprises a repeating pattern.

10. The antenna system of claim 1, wherein the transmission line is a single coaxial cable.

11. The antenna system of claim 1, wherein the first frequency band ranges from about 500 MHz to about 50 GHz.

12. The antenna system of claim 1, wherein the second frequency band ranges from about 10 MHz to about 1 GHz.

13. The antenna system of claim 1, wherein the transmit signal is associated with a first clock frequency, and wherein the tuning circuit is configured to synchronize a local clock frequency with the first frequency.

14. The antenna system of claim 1, wherein the radio frequency circuit comprises a front end module configured to generate the RF signal and a control circuit configured to modulate the control signal onto the RF signal using amplitude-shift keying modulation to generate the transmit signal.

15. The antenna system of claim 14, further comprising at least one additional modal antenna including a parasitic element;
   wherein:
      the radio frequency circuit comprises at least one additional front end module that is configured to transmit an RF signal to the driven element of the at least one additional modal antenna; and
      the control circuit of the radio frequency circuit is configured to adjust a mode of the at least one additional modal antenna by modulating a control signal onto the RF signal that is transmitted to the driven element of the at least one additional modal antenna.

16. A method for controlling an antenna system:
   modulating, at a radio frequency circuit, a control signal onto an RF signal to generate a transmit signal;
   communicating the transmit signal via a single coaxial transmission line to a modal antenna comprising a driven element and a parasitic element positioned proximate to the driven element, the modal antenna operable in a plurality of different modes;
   demodulating, at a tuning circuit, the control signal to adjust a mode of the modal antenna via the control signal to control the antenna system; and
   controlling, from the radio frequency circuit, the antenna system via the control signal.

17. The method of claim 16, wherein modulating, at the radio frequency circuit, the control signal onto the RF signal at the radio frequency circuit comprises modulating the control signal onto the RF signal using amplitude-shift keying modulation.

18. The method of claim 16, wherein modulating, at the radio frequency circuit, the control signal onto the RF signal at the radio frequency circuit comprises modulating the control signal onto the RF signal using on-off keying modulation.

19. An antenna system, comprising:
   a modal antenna comprising a driven element and a parasitic element positioned proximate to the driven element, the modal antenna operable in a plurality of different modes, each mode associated with a different radiation pattern;

a radio frequency circuit; and a transmission line coupling the radio frequency circuit to the modal antenna;

wherein the radio frequency circuit is configured to modulate a control signal onto an RF signal to generate a transmit signal for communication over the transmission line to control the antenna system;

wherein the transmit signal is associated with a first clock frequency, and wherein the tuning circuit is configured to synchronize a local clock frequency with the first frequency.

20. An antenna system, comprising:

a modal antenna comprising a driven element and a parasitic element positioned proximate to the driven element, the modal antenna operable in a plurality of different modes, each mode associated with a different radiation pattern;

a radio frequency circuit;

a transmission line coupling the radio frequency circuit to the modal antenna;

a tuning circuit;

wherein:

the radio frequency circuit is configured to modulate a control signal onto an RF signal to generate a transmit signal for communication over the transmission line to control the antenna system; and the tuning circuit is configured to demodulate the control signal such that the radio frequency circuit can adjust a mode of the modal antenna via the control signal to control the antenna system.

* * * * *